Figure 1:
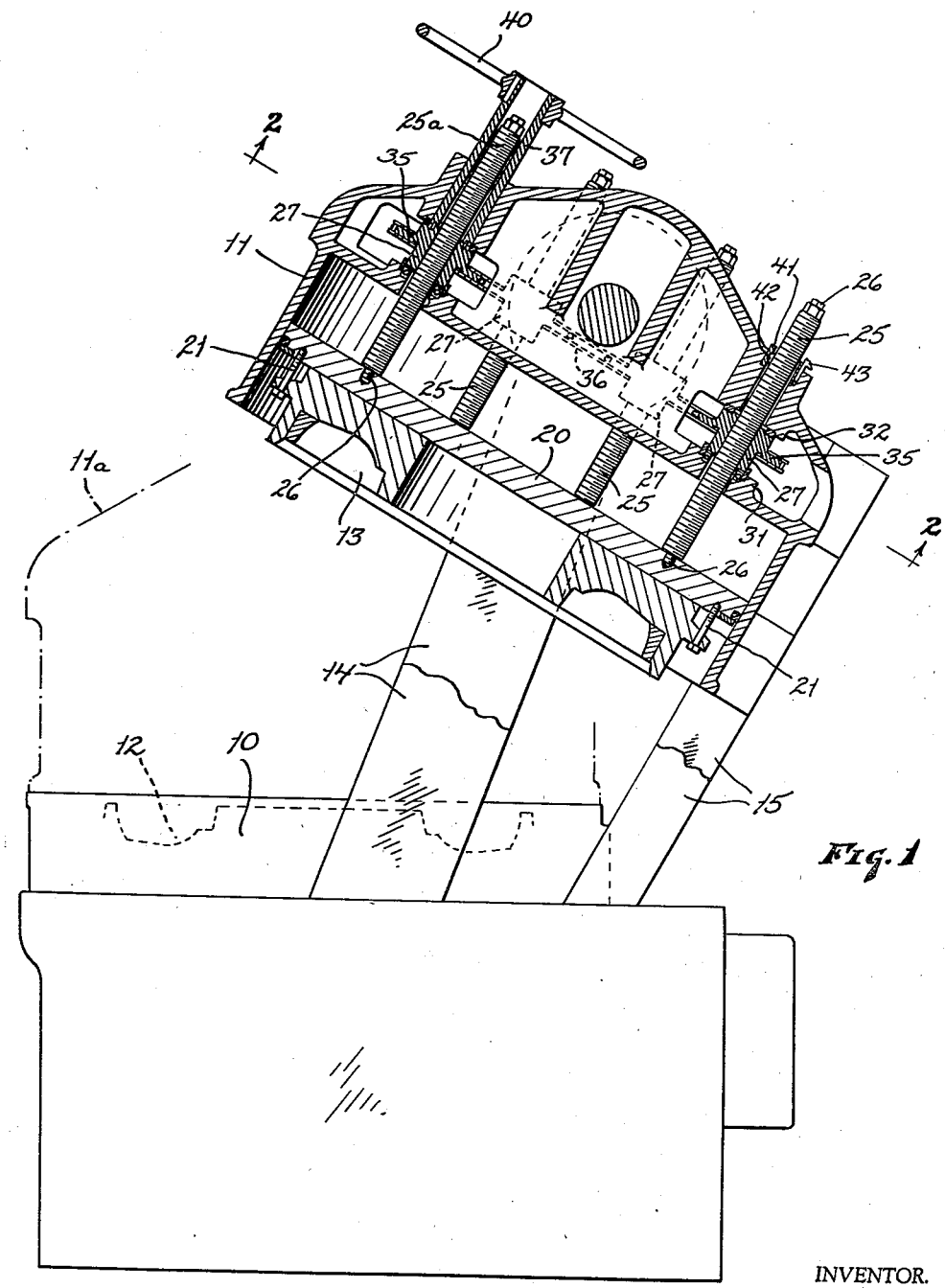

June 9, 1942.                H. C. BOSTWICK                2,285,389
                                 PRESS
                           Filed July 9, 1940              2 Sheets-Sheet 2
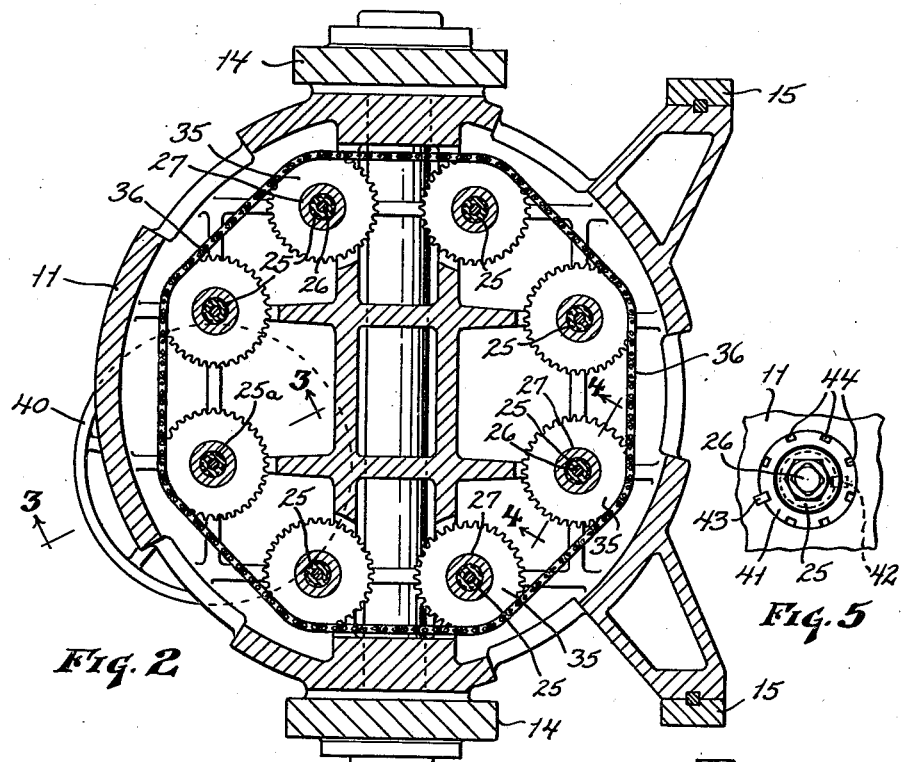
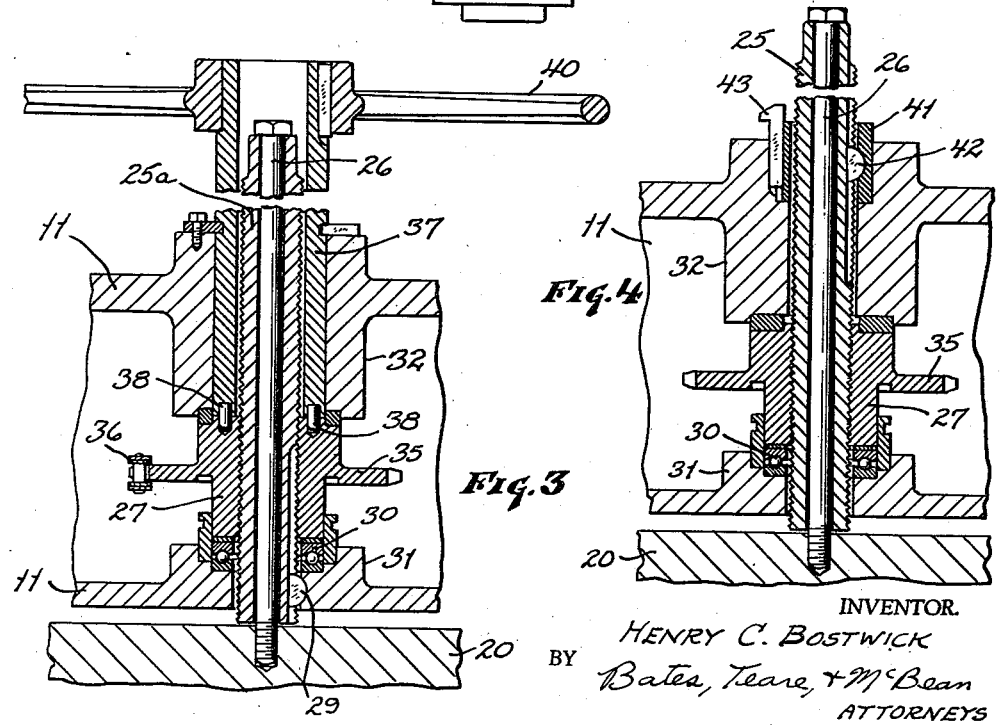
INVENTOR.
HENRY C. BOSTWICK
BY Bates, Teare, & McBean
                    ATTORNEYS Patented June 9, 1942

2,285,389

UNITED STATES PATENT OFFICE 2,285,389

PRESS

Henry C. Bostwick, Akron, Ohio, assignor to The Akron Standard Mold Company, Akron, Ohio, a corporation of Ohio Application July 9, 1940, Serial No. 344,526

10 Claims. (Cl. 18—17)

This invention relates to presses in which articles such as automobile tires may be vulcanized. Usually presses of this character have two press heads, each of which carries a mold part, and the heads are interconnected in some suitable way to facilitate opening and closing for the purpose of inserting articles, vulcanizing them, and thereafter removing them from the mold.

In the case of tires, it is necessary to change the mold part whenever tires of a different size are to be vulcanized. This is done by removing the bolts which normally hold the mold part to the supporting plate, and then adjusting each supporting screw individually up or down as may be required, so as to equalize the strain which is placed upon the mold part when the press is closed. If one adjusting screw should be tightened more than any of the others, the press would be subjected to stress unevenly. In the past this occurrence has in some cases been so severe that the press has been broken.

An object of the present invention is to provide a mold part supporting structure, by means of which the mold may be quickly changed in a press without the exercise of exceptional skill in effecting the necessary adjustments which would bring the mold parts together upon the closing of the press.

The invention is shown in connection with a press, wherein there is a stationary lower press head and a movable upper press head, and wherein the upper press head has a plate that is supported by a series of spindles which have a threaded engagement with the heads and project therethrough. Each spindle has the outer end thereof formed for engagement with a wrench for individual adjustment to effect rapid leveling of the plate which is mounted inside the press head. The plate in turn has provision for detachably holding a mold part thereto.

A further object of the present invention is to provide means whereby all of the mold part supporting spindles may be actuated simultaneously so as to move the mold part inwardly or outwardly with respect to the press head uniformly on all portions thereof. An advantage of this arrangement, is that the mold carrying plate may be quickly leveled with respect to the stationary mold part by individual adjustment of the spindles with respect to each other, and thereafter all of the spindles may be actuated simultaneously and uniformly after the mold part is attached thereto until the mold part is drawn into the press head an amount that is necessary to make an edge to edge contact with the coacting mold part when the press is closed.

Referring now to the drawings, Fig. 1 shows a press in open position with the upper portion thereof shown in section, and illustrating my invention thereon; Fig. 2 is a section taken on a plane indicated by the lines 2—2 in Fig. 1; Fig. 3 is a section taken on the plane indicated by the lines 3—3 in Fig. 2, and Fig. 4 is a section taken on the plane indicated by the lines 4—4 in Fig. 2, and Fig. 5 is a top plan view of the spindle shown in Fig. 4.

The press with which I have shown my invention has a lower head indicated at 10 and an upper head indicated at 11. The lower head has a mold part 12 mounted therein, while the upper head has a mold part 13 carried therein for coaction with the mold part 12, whenever the upper press head is moved to the broken line position 11a. At such time, the upper and lower mold parts must meet in edge to edge contact around the article to be molded therein, and the present invention provides a mechanism by means of which such adjustment can be accurately and quickly made. Any suitable mechanism may be used for raising and lowering the upper press head with respect to the lower press head, and, hence, such mechanism is not shown in detail herein. It is sufficient only to state that in the present embodiment, the upper head is supported upon bars 14 and 15, the movement of each of which is controlled by the press actuating mechanism which usually comprises an electric motor or a fluid actuated ram.

The mold part 13 is shown as being detachably connected to a plate 20 as by securing members 21, which are positioned at spaced intervals around the periphery of the mold part 13. The plate in turn is then mounted for adjustment inwardly or outwardly with respect to the press head. Such mounting is illustrated in this application as embodying eight threaded spindles 25 which extend through the press head and are attached at their inner ends to the plate and are shaped at the outer ends thereof for engagement by a wrench. Each spindle preferably has a passageway extending therethrough, by means of which a bolt 26 may be threaded to the plate. Each spindle has the lower end thereof abutting the plate 20, and has the outer portion thereof threaded for engagement with a nut 27 which may be journalled for rotation upon a bearing 30, between bosses 31 and 32 on the press head 11. Thus, as each nut is rotated, the associated spindle is caused to move inwardly or outwardly, as the case may be, with respect to the press head.

To rotate all of the nuts 27 in unison and at a uniform rate, I interconnect them, preferably by a chain and sprocket connection, and I arrange to move the chain in any desired direction. Thus, each nut may have a special sprocket wheel 35, either formed thereon or attached rigidly thereto, while a chain 36 in the form of an endless belt encloses the sprockets and thus has a driving connection with each of them.

To drive the chain, I have shown an operating member in the form of a sleeve 37 which extends downwardly through the press head around one of the spindles, designated 25a, and has a driving connection with the associated nut, as by pins 38 (shown in Fig. 3). The sleeve 37 may project above the spindle, and have an operating member, such as a wheel 40, attached thereto above the press head. Thus, whenever the wheel is rotated, the sleeve 37 and the associated nut 27 are rotated, and the chain belt 36 is thereby moved in a direction to cause rotation of the sprocket wheels that are attached to all of the other nuts. In this way each spindle is caused to move in an axial direction at the same rate as the other spindles, and, hence, the plate 20 and the associated mold part 13 move axially of the press head while remaining parallel to their original position.

Normally each spindle is held against rotation with respect to the press head, and to accomplish this feature, the spindle 25a has a splined connection 29 with the press head 11, while each of the spindles 25 has a splined connection 42 with a collar 41, which, in turn, may be held against rotation with respect to the press head by means of a key 43. This last-named key is removable for enabling the collar to turn with the spindle, with respect to the press head, whenever individual adjustment of any spindle is desired. To permit reconnection between the collar and the press head, I have shown the collar as having a number of key ways 44 positioned at spaced intervals thereon as shown in Fig. 5, by means of which the collar may be adjusted to bring the nearest key way into registration with that on the press head for reception of the key 43 after the spindle has been manually adjusted for the purpose of leveling the plate 20.

While I have shown the upper mold part 13 as being attached to the plate 20, I may, if desired, allow the part 13 to rest on the mold part 12. In this way the mold, together with the tire therein, may be handled as a unit and simply deposited within the press. Then, after the plate 20 is adjusted to obtain uniform bearing, the press is closed until vulcanization is completed. Thereafter the mold, with the vulcanized tire therein, may be removed as a unit from the press and opened at any convenient location.

An important advantage of the present invention is the fact that an operator may, by turning the hand wheel 40, cause axial movement of the mold part with respect to the press head, and may maintain the head in absolute parallelism with its original position. This facilitates moving the head inwardly or outwardly, as the case may be, to effect accurate registration between the mold parts whenever the molds are changed. A further important feature of the invention is the fact that any spindle 25 may be disconnected from the press head and then rotated independently of the others (while its associated nut is held stationary by the sprocket chain), and thereby effect such slight local adjustment of the plate inwardly or outwardly as desired to assure a level or proper position of the plate before the hand wheel is rotated. Individual adjustment of the spindle 25a may be obtained by turning the hand wheel 40 after the keys 43 have been removed. This invention has greatly facilitated the replacement of molds by reducing the time in which the removal and replacement could be accomplished. Additionally, the invention has provided means for effecting rapid and independent adjustment of any portion of the mold part with respect to any other portion, wherefore the danger of breaking the press because of such uneven adjustment has been reduced to a minimum.

I claim:

1. A press having in combination, a pair of coacting press heads, a pair of coacting mold parts therein, means for adjusting the pressure of the heads against said parts, said means comprising spaced threaded spindles mounted within one of the heads, a nut journalled in the head and in threaded engagement with each spindle, and means for simultaneously turning the nuts.

2. A press comprising in combination, a pair of coacting press heads, a pair of coacting mold parts therein, means for adjusting the pressure of the heads against said parts, said means comprising coacting screw and nut couples carried by one of the heads, an operating member projecting through the head and means connecting said member with each nut, whereby rotation of the member effects simultaneous rotation of the nuts at the same rate.

3. A press, having in combination, a pair of coacting press heads, a pair of coacting mold parts therein, means for adjusting the pressure of the heads against said parts, said means including a plurality of screw and nut couples carried by one of the heads, means for selectively holding some of the screws against rotation, other means for rotating all of the nuts simultaneously, said first-named means including detachable connections with the last mentioned head, whereby at least some of the screws may be rotated independently of the other screws.

4. A press having in combination, a pair of coacting press heads, a pair of coacting mold parts therein, a plate bearing against one of the mold parts and secured to it, a plurality of threaded spindles supporting said plate, a nut in threaded engagement with each spindle, a sprocket wheel carried by each nut and an endless chain engaging all of the sprocket wheels.

5. A press comprising in combination, a pair of coacting press heads, a mold part disposed within each head, means for adjustably supporting at least one of the mold parts within its associated head, said means including a plurality of threaded screw and nut couples, a sprocket wheel carried by each nut, an endless chain engaging the sprocket wheels in such manner that movement of the chain in one direction causes rotation of all of the nuts in the same direction, and a rotatable member for actuating said chain.

6. A press having in combination, a pair of coacting press heads, a mold part positioned within each head, means for adjusting at least one of the mold parts within the head, such means including a plurality of spaced screw and nut couples disposed upon the periphery of a circle, a sprocket wheel carried by each nut, and an endless chain enclosing all of the sprocket wheels and operatively connected thereto, a member projecting outside the head for actuating the chain, a hand wheel attached to said member, at least some of said screws having a detachable connection with the head, whereby they may be rotated independently of their associated nuts so as to skew the mold part.

7. In combination, a pair of coacting press heads adapted to receive a pair of coacting mold parts, a pressure plate disposed within one of the heads, a plurality of spaced threaded spindles connected to said plate, said spindles being mounted in one of said heads for movement independently of each other, and means connecting all of the spindles for moving them collectively, whereby the pressure plate may be selectively adjusted with respect to the head, either in a selected region or over the entire region thereof.

8. In combination, a press having coacting press heads, a pair of coacting mold parts thereon, a plate bearing against one of the mold parts, a plurality of threaded spindles supporting said plate, means carried by one of the heads for moving all of the spindles axially and simultaneously at the same rate to adjust the plate axially with reference to the last mentioned head, said means also including a detachable connection between at least some of the spindles and the last mentioned head, whereby some of the spindles may be moved independently of the other spindles.

9. In combination, a press head, a mold part carried thereby, means for adjusting the relative position of the press head and the mold part comprising a plurality of screw and nut couples, one member of the couple being connected to the head and the other to the mold part, each couple being adjustable independently of the others and means for simultaneously adjusting all of the couples.

10. A press having in combination, a pair of coacting press heads, adapted to receive a pair of coacting mold parts, a member mounted within one of the heads and adapted to bear against one of the mold parts for the purpose of exerting pressure thereon whenever the press is closed, a plurality of devices having portions extending through one of the heads for adjustably supporting the member therein, said devices being individually adjustable to move the member with respect to the head into a position out of parallelism with its original position, and means for moving said devices as a unit to move the member with respect to the head while maintaining it parallel to its original position.

HENRY C. BOSTWICK.